US012777517B2

(12) United States Patent
Tao et al.

(10) Patent No.: US 12,777,517 B2
(45) Date of Patent: Oct. 27, 2026

(54) METHODS FOR IMPLEMENTING UPLINK CHANNEL ACCESS IN ELAA-BASED COMMUNICATION SYSTEM

(71) Applicant: Alcatel Lucent, Nozay (FR)

(72) Inventors: Tao Tao, Shanghai (CN); Jianguo Liu, Shanghai (CN); Yan Meng, Shanghai (CN); Junrong Gu, Shanghai (CN); Dawei Wang, Shanghai (CN); Zhe Luo, Shanghai (CN); Gang Shen, Shanghai (CN)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 18/240,695

(22) Filed: Aug. 31, 2023

(65) Prior Publication Data

US 2023/0422295 A1 Dec. 28, 2023

Related U.S. Application Data

(63) Continuation of application No. 16/089,576, filed as application No. PCT/IB2017/000446 on Mar. 30, 2017, now abandoned.

(30) Foreign Application Priority Data

Mar. 30, 2016 (CN) ......................... 201610192417.1

(51) Int. Cl.
*H04W 74/00* (2009.01)
*H04W 16/14* (2009.01)
(Continued)

(52) U.S. Cl.
CPC ......... *H04W 74/006* (2013.01); *H04W 16/14* (2013.01); *H04W 72/121* (2013.01); *H04W 72/23* (2023.01); *H04W 74/0808* (2013.01)

(58) Field of Classification Search
CPC ... H04W 74/006; H04W 72/23; H04W 16/14; H04W 72/121; H04W 74/0808
See application file for complete search history.

(56) References Cited

U.S. PATENT DOCUMENTS 7,631,096 B1 * 12/2009 Yeh ....................... H04L 12/413 709/224
11,240,157 B1 * 2/2022 Callaghan ............... H04L 69/22
(Continued)

FOREIGN PATENT DOCUMENTS

CN 101330372 A 12/2008
CN 103650622 A 3/2014
(Continued)

OTHER PUBLICATIONS

International Search Report for PCT/IB2017/000446 dated Jul. 18, 2017.

(Continued)

*Primary Examiner* — Faruk Hamza
*Assistant Examiner* — Tito Q Pham
(74) *Attorney, Agent, or Firm* — Lippes Mathias LLP

(57) ABSTRACT

The disclosure provides a method for assisting a UE to implement a UL channel access in a base station of an eLAA-based communication system. The method comprises determining a listen-before-talk (LBT) priority for the UE; and transmitting a first signaling indicating the determined LBT priority to the UE. An enhanced UL channel access mechanism is proposed by the disclosure. In this mechanism, the eNB can provide some assistance to facilitate UL access. Chances of multiple user multiplexing and spectrum efficiency in LAA UL can be improved by this solution.

20 Claims, 2 Drawing Sheets

(51) Int. Cl.

| | |
|---|---|
| ***H04W 72/121*** | (2023.01) |
| ***H04W 72/23*** | (2023.01) |
| ***H04W 74/0808*** | (2024.01) |

(56) References Cited

U.S. PATENT DOCUMENTS

| | | | | |
|---|---|---|---|---|
| 2011/0013513 | A1 | 1/2011 | Lai et al. | |
| 2013/0229995 | A1 | 9/2013 | Cai et al. | |
| 2013/0322378 | A1 | 12/2013 | Guan et al. | |
| 2013/0343239 | A1 | 12/2013 | Damnjanovic et al. | |
| 2014/0341018 | A1 | 11/2014 | Bhushan et al. | |
| 2015/0373682 | A1 | 12/2015 | Bashar et al. | |
| 2016/0143014 | A1 | 5/2016 | Mukherjee et al. | |
| 2017/0223550 | A1 | 8/2017 | Takeda et al. | |
| 2017/0366307 | A1 | 12/2017 | Xing et al. | |
| 2018/0279367 | A1* | 9/2018 | Han | H04W 74/0808 |
| 2018/0317246 | A1* | 11/2018 | Mukherjee | H04W 72/543 |
| 2018/0332579 | A1 | 11/2018 | Kang et al. | |
| 2018/0352573 | A1* | 12/2018 | Yang | H04W 16/14 |
| 2019/0014596 | A1* | 1/2019 | Yang | H04W 72/21 |

FOREIGN PATENT DOCUMENTS

| | | | | | |
|---|---|---|---|---|---|
| CN | 104396178 | A | | 3/2015 | |
| CN | 102624507 | B | | 4/2015 | |
| CN | 106559882 | A | * | 9/2015 | |
| CN | 105406948 | A | | 3/2016 | |
| CN | 106559795 | B | * | 7/2022 | H04W 16/14 |
| WO | WO 2012/151060 | | | 11/2012 | |
| WO | WO 2015/031464 | | | 3/2015 | |
| WO | WO 2016/017355 | | | 2/2016 | |

OTHER PUBLICATIONS

LG Electronics, "LBT schemes in LAA UL," 3rd Generation Partnership Project (3GPP), 3GPP TSG RAN WG1 meeting #84, R1-160630, 10 pgs XP051053959, St. Julian's Malta, Feb. 15-19, 2016.

LG Electronics, "PUSCH transmission in LAA," 3rd Generation Partnership Project (3GPP), 3GPP TSG RAN WG1 meeting #84, R1-160625, 5 pgs XP051053954, St. Julian's Malta, Feb. 15-19, 2016.

MediaTek Inc., "Uplink channel access in LSAA", 3GPP TSG RAN WG1 #84, R1-160976, St. Julian's, Malta, Feb. 15-19, 2016, pp. 1-11.

MCC Support, "Draft Report of 3GPP TSG RAN WG1, #83, V0.1.0 (Anaheim, CA, Nov. 15-22, 2015)," 3gpp TSG RAN WG1, Meeting #84 R1-16xxxx, St. Julian's Malta, Feb. 15-19, 2016, 122 pages.

HiSilicon Huawei, "Other issues related to LBT for eLAA," 3GPP RAN WG1, Meeting #84, R1-160741, St. Julian's, Malta, Feb. 15-19, 2016, 6 pgs.

Huawei, "Discussion on LBT requirement and LBT test for LAA," 3GPP TSG RAN WG4, Meeting #78, R4-160572, St. Julian's, Malta, Feb. 15-19, 2016, 4 pgs.

BlackBerry UK Limited, "QCI mapping to Downlink Channel Access Priority Classes", 3GPP TSG RAN WG2, Meeting #93, R2-161586, St. Julian's, Malta Feb. 15-19, 2016, 10 pgs.

LG Electronics, "LBT schemes in LAA UL," 3GPP TSG RAN WG1, Meeting #84, R1-160630, St. Julian's, Malta, Feb. 15-19, 2016, 2 pgs.

* cited by examiner

METHODS FOR IMPLEMENTING UPLINK CHANNEL ACCESS IN ELAA-BASED COMMUNICATION SYSTEM

This application is a continuation of U.S. application Ser. No. 16/089,576 filed Sep. 28, 2018, which in turn is a National Stage Entry of International Application No. PCT/IB2017/000446 filed Mar. 30, 2017, which claims priority to China Application No. 201610192417.1, filed Mar. 30, 2016.

FIELD

The present disclosure relates to mobile communication technologies, and more specifically, to methods for implementing an uplink channel access in an eLAA-based communication system and methods for assisting a User Equipment (UE) to maintain a contention window size in a base station of the eLAA-based communication system.

BACKGROUND

In RAN #70, a new work item on enhanced LAA for LTE (eLAA-LTE) is approved to support Licensed-Assisted Access (LAA) SCell operation on unlicensed spectrum for Uplink (UL). The listen-before-talk (LBT) as one of the most important mechanisms to ensure the coexistence fairness should be designed carefully. In current ETSI BRAN discussions, it is highly possible to support the UL transmission within a Maximum Channel Occupancy Time (MCOT) acquired by the base station (eNB). In this case, 25 μs one-shot Clear Channel Assessment (CCA) as the LBT operation may be sufficient within the gap between the end of a Downlink (DL) transmission and the start of a UL transmission. However, for the UL transmission burst, the LBT operation is not clear at the moment.

In the RAN1 #84 meeting, the LBT Category 4 channel access procedure has been agreed to be supported in the LAA UL. However, the application scenario for the UL LBT Category 4 is not clear. To start a UL transmission burst as shown in FIG. 1, the LBT Category 4 can ensure better coexistence fairness between WiFi and asynchronous LAA DL transmission.

Furthermore, the detailed UL LBT Category 4 design (e.g., the channel access parameters, the mechanism of Contention Window Size (CWS) adjustment) is still an open issue. In the DL LAA, the channel access parameters and CWS value are determined at the eNB side since eNB is the one who will contend for channel access. However, this is not applicable to maintain the UL access parameters at the UE side since the LAA UL transmission is scheduled by the eNB. For example, if an eNB schedules a large number of continuous subframes for a UE and the UE chooses a set of channel access parameters corresponding to a high priority, the UE has to stop the transmission and perform LBT again when the MCOT of the higher priority is reached. If an eNB schedules only a small number of subframes (e.g. 1 subframe) for a UE in a UL transmission burst and the UE chooses a set of channel access parameters corresponding to a low priority, the UE will take a long time to compete for channel access. This will decrease the spectrum efficiency of the UL transmission.

In addition, the CWS adjustment is based on the HARQ-ACK feedback information in the DL LBT procedure. For the UL, such an explicit feedback is not available at the UE side currently in LAA. A UE may assume that the PUSCH transmission is successful if it does not detect a corresponding PDCCH/EPDCCH with DCI format 0/4 within a certain period of time. If the eNB does not continue to retransmit a certain HARQ process (and thereby put this for higher layer retransmission—i.e. additional delay and much larger overhead in the end will be caused), the reliability of such HARQ-ACK would be lowered.

Furthermore, the LBT gap as a new feature in the LAA frame structure is being discussed in 3GPP. Considering multi-user multiplexing in LAA UL, multiple UEs can perform their LBT procedures in the LBT gap. If different UEs have different CWSs, the possibility for these UEs to be multiplexed in this subframe is relatively small. If the eNB knows the CWS of each UE, it can avoid scheduling UEs with very different CWSs in one subframe or can configure a more suitable LBT gap.

SUMMARY

Therefore, it's required to propose a technical solution for maintaining UL channel access parameters at the eNB side to assist a UE to implement the UL channel access in the eLAA-based communication system.

According to a first aspect of the present disclosure, there is provided a method for assisting a UE to implement a UL channel access in a base station of an eLAA-based communication system. The method includes determining a listen-before-talk (LBT) priority for the UE; and transmitting a first signaling indicating the determined LBT priority to the UE.

According to a second aspect of the present disclosure, there is provided a method for assisting a UE to implement a UL channel access in a base station of an eLAA-based communication system. The method includes determining a set of UL channel access parameters according to predetermined factors; and transmitting a first signaling indicating a portion of the determined set of UL channel access parameters to the UE.

According to a third aspect of the present disclosure, there is provided a method for assisting a UE to implement a UL channel access in a base station of an eLAA-based communication system. The method includes indicating to the UE an expected transmission duration scheduled for the UE in the UL transmission burst.

According to a fourth aspect of the present disclosure, there is provided a method for implementing a UL channel access in a UE of an eLAA-based communication system. The method includes receiving from a base station a first signaling, which indicates a LBT priority determined by the base station for the UE or a portion of a set of UL channel access parameters determined by the base station for the UE.

According to a fifth aspect of the present disclosure, there is provided a method for implementing a UL channel access in a UE of an eLAA-based communication system. The method includes acquiring from a base station an expected transmission duration scheduled for the UE in a UL transmission burst; or in case that the expected transmission duration is not acquired from a base station, setting the expected transmission duration to be not more than 1 sub-frame.

According to a sixth aspect of the present disclosure, there is provided a method for assisting a UE to maintain a CWS in a base station of an eLAA-based communication system. The method includes configuring a set of CWSs, wherein respective CWSs in the set of CWSs are corresponding to different LBT priorities and the set of CWSs is applicable to all UEs; and simultaneously updating CWSs of all LBT priorities based on a predetermined trigger mechanism.

According to a seventh aspect of the present disclosure, there is provided a method for assisting a UE to maintain a CWS in a base station of an eLAA-based communication system. The method includes configuring a set of CWSs for each UE, wherein each CWS in the set of CWSs is corresponding to a different LBT priority; and updating the CWS of the LBT priority based on a predetermined trigger mechanism.

With the present disclosure, an enhanced UL channel access mechanism is provided. In this mechanism, the eNB can provide some assistance to facilitate UL access. Chances of multiple user multiplexing and spectrum efficiency in LAA UL can be improved by this solution.

In contrast, the existing technical solution using UL LBT Category 4 also uses DL mechanism in UL. However, the LAA UL transmission is substantially controlled by the eNB. Before a consensus is achieved, if a user is able to implement the LBT entirely freely, multiple user multiplexing will be interrupted and spectrum efficiency will be reduced. This defect can be solved by the technical solution of this disclosure.

BRIEF DESCRIPTION OF THE DRAWINGS

Other features, objectives and advantages of the present disclosure will become more apparent from following detailed description of the nonrestrictive embodiments of the disclosure in conjunction with the accompanying drawings, wherein.

In the accompanying drawings, same or similar reference numbers are used for the same or corresponding parts or features.

DETAILED DESCRIPTION

Figure 1:
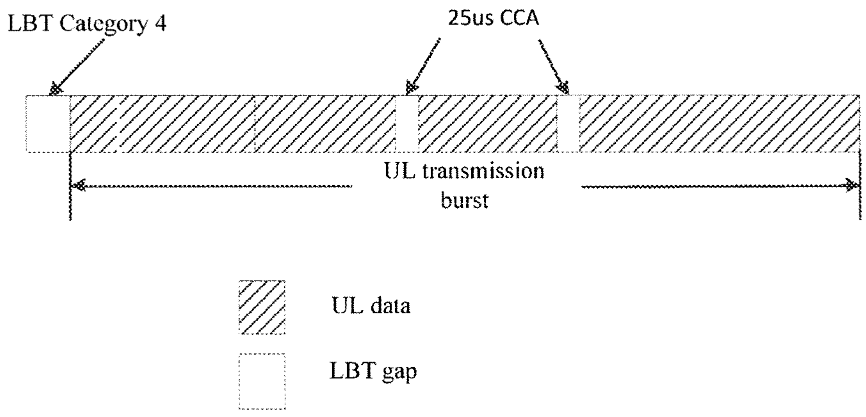
FIG. 1 illustrates the frame structure for the UL LAA.

In this disclosure, a detailed design for the UL LBT Category 4 is proposed to support multiple QoS traffics in the UL LAA. The proposed LBT design is assisted by the eNB with the following features:

Determination of a Set of Channel Access Parameters

The set of channel access parameters corresponding to the LBT priority should be determined before the UE performs the LBT Category 4 operation. The eNB will determine the channel access parameters by considering the following factors:

- transmission duration of the UL transmission burst;
- number of the UEs scheduled in the UL transmission burst;
- traffic types and interference situations of the scheduled UEs;
- LAA TDD configuration; and
- partial or full of above factors.

In an embodiment of the disclosure, the channel access parameters determined by the eNB should be further acquired by the UE. This will be discussed later.

In an embodiment, the eNB can explicitly indicate the selected LBT priority X to the UE via Layer 1 signaling. The set of channel access parameters corresponding to the LBT priority X used for the LBT operation can be determined in the UE.

Herein, preferably, the relations between LBT priorities and a corresponding set of UL channel access parameters are pre-stored at the eNB side and the UE side, respectively. The eNB then is able to determine the LBT priority X according to the table after a set of UL channel access parameters is determined. The UE is able to determine corresponding UL channel access parameters according to the table and based on the aforementioned signaling In addition, the UE could maximize channel occupancy by transmitting additional traffics corresponding to LBT priorities larger than X only if the traffics corresponding to LBT priorities smaller than or equal to X have been exhausted. In the LBT framework, the LBT priorities smaller than or equal to X indicate LBT priorities that are not less than the LBT priorities determined by the eNB. The LBT priorities larger than X indicate LBT priorities that are less than the LBT priorities determined by the eNB.

Furthermore, the UE is able to further adjust the LBT priorities according to its own traffic type.

In another embodiment, the eNB can indicate some or one of the access parameters (e.g., the CWS value, or maximum channel occupancy time, or the LBT gap configuration) to the UE via Layer 1 signaling, and then the UE has flexibility to interpret the other access parameters according to the pre-defined LBT priority table (the aforementioned table) and its own traffic type.

In another embodiment, if the information associated with an expected transmission duration can be acquired by the UE, the UE could determine the LBT priority X and the corresponding UL channel access parameters with any or any combination of the following considerations:

1. The MCOT of the selected LBT priority X shall not be shorter than the expected transmission duration.
2. The traffic corresponding to the LBT priorities smaller than or equal to X can be transmitted in the expected transmission duration.

Herein, the expected transmission duration indicates the subframes or time scheduled for transmission by the UE in the UL transmission burst.

Furthermore, similarly, as mentioned above, the UE could maximize channel occupancy by transmitting additional traffics corresponding to LBT priorities larger than X only if the traffics corresponding to LBT priorities smaller than or equal to X have been exhausted.

Preferably, the transmission duration can be indicated to the UE from the eNB in either an implicit or an explicit manner.

In an embodiment, the eNB can dynamically or semi-statically inform the expected transmission duration to the UE through Layer 1 signaling.

In another embodiment, the UE can acquire the transmission duration according to a UL grant in case of multi-subframe scheduling.

In yet another embodiment, the UE could assume that the transmission duration is not more than one subframe if no specific information is received.

In each of the above embodiments, the UE will perform an LBT operation based on the determined UL channel access parameters.

Preferably, when multiple UEs will perform the LBT operations in a transmission burst, the eNB can configure the same set of access parameters to all UEs or configure different sets of access parameters to respective UEs.

CWS Maintenance

The eNB can help the UE to maintain and adjust the CWS value.

a) Solution 1: A Common CWS maintenance is configured for all UEs served by the eNB.

In this solution, the eNB maintains only one set of CWSs with respect to different priorities of all UEs. Table 1 shows a CWS table for one UE in which corresponding CWSs are set for different priorities. Furthermore, in this embodiment, all UEs have the same CWS table. That is to say, only one set of CWSs needs to be maintained.

TABLE 1

| CWSs for a UE | |
|---|---|
| Priority 1 | CWS 1 |
| Priority 2 | CWS 2 |
| Priority 3 | CWS 3 |
| Priority 4 | CWS 4 |

In this solution, the CWSs will be simultaneously updated for all LBT priorities based on the result of the CWS trigger mechanisms.

In an embodiment, the CWS trigger mechanism can be based on the PUSCH decoding result in the first subframe of the last UL transmission burst. In the last UL transmission burst, only the PUSCH decoding result of UEs that perform LBT Category 4 operations are considered. It should be noted that the last UL transmission burst corresponding to a UE may be different for each UE and whether it is successful in decoding is also different. Herein, PUSCH decoding result of those UEs that implement LBT Category 4 operations will impact the update of aforementioned CWSs.

In an embodiment of this disclosure, the last UL transmission burst is for example completely a UL transmission burst.

In another embodiment, the CWS trigger mechanism can be based on PUSCH decoding result in the last valid subframe of the last UL transmission burst. Similarly, in the last UL transmission burst, only PUSCH decoding result of UEs that perform LBT Category 4 operations are considered. Furthermore, the last UL transmission burst corresponding to a UE may be different for each UE and whether it is successful in decoding is also different. Similarly, herein, PUSCH decoding result of those UEs that implement LBT Category 4 operations will impact the update of aforementioned CWSs.

Similarly, the last UL transmission burst is for example completely a UL transmission burst.

In yet another embodiment, the CWS trigger mechanism can be based on PUSCH decoding result in all subframes of the last UL transmission burst. In the last UL transmission burst, all UEs perform UL transmissions. In this embodiment, as long as the UEs perform the UL transmissions, the PUSCH decoding result of the UEs will impact the update of the CWSs.

Preferably, the PUSCH decoding result can be defined as the ratio of the number of incorrectly decoded PUSCHs to the number of correctly decoded PUSCHs. If this ratio is larger than a pre-defined value, the CWSs will be exponentially or linearly increased. Otherwise, the CWSs will be reset to the minimum CWSs corresponding to respective priorities.

Finally, the eNB will transmit the updated CWSs or a backoff counter generated therefrom to the UE via a Layer 1 signaling.

b) Solution 2: Individual CWS maintenances are configured for different UEs.

The eNB maintains individual sets of CWSs with respect to different priorities for respective UEs. To adjust CWSs of each UE, the follow solutions are considered.

i. For all LBT priorities, CWSs will be exponentially or linearly updated based on the result from the CWS trigger mechanism. In an embodiment, the CWS trigger mechanism can be based on the PUSCH decoding result of the first subframe in the last UL transmission burst. In the last UL transmission burst, the UE performs LBT Category 4 operation.

In an embodiment of this disclosure, the last UL transmission burst is for example completely a UL transmission burst.

Furthermore, if the PUSCH is decoded correctly, all CWSs of different LBT priorities can be reset to their minimum values. Otherwise, the CWSs will be exponentially or linearly increased.

ii. For conditional LBT priorities, CWSs will be updated. In an embodiment, only the LBT priority utilized in the last transmission burst will update its CWS. Other LBT priorities maintain their CWS values.

Furthermore, a CWS can be reset if the number of times for using its maximal value reaches a predetermined number of times.

Preferably, for a certain UE, its CWS can be reset if the UE is not scheduled for a predetermined period of time.

Finally, similar to solution 1, when the UE is scheduled for UL transmission, the eNB will transmit the CWS value or a backoff counter generated therefrom to the UE via a Layer 1 signaling.

Embodiments of this disclosure will be set forth in details hereinafter. Specifically, the proposed UL channel access enhancement with eNB assistance includes the following features:

-Determining the Set of Channel Access Parameters

Figure 2:
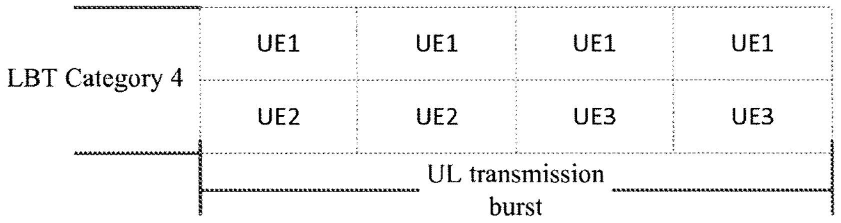
FIG. 2 illustrates the UL transmission burst according to an embodiment of this disclosure.

The eNB determines the channel access parameters for the UE that will perform the LBT Category 4 operation before the UL transmission. We can assume a scenario as shown in FIG. 2.

The UE1 and UE2 will perform LBT Category 4 operations before their UL transmissions. The eNB can help to determine the channel access parameters used in the LBT operations for the two UEs. The transmission duration for UE1 is 4 ms and the transmission duration for UE2 is 2 ms. According to the LBT priority definition in DL, UE1 should use a LBT priority larger than or equal to 3 and UE2 can use a LBT priority larger than or equal to 1 due to MCOT restriction. To obtain the channel access parameters at UE sides, the following options can be considered:

1. The eNB indicates the LBT priorities to UEs via Layer 1 signaling.

If the eNB configures a common set of UL channel access parameters for all UEs, the eNB can indicate the LBT priority 3 to both UE1 and UE2.

If the eNB configures different channel access parameters for each UE, the eNB could indicate the LBT priority 3 to UE1 and the LBT priority 1 to UE2.

2. The eNB indicates some of the access parameters (e.g., the CWS value, or maximum channel occupancy time, or the LBT gap configuration) to the UE via Layer 1 signaling.

For example, the eNB can indicate the MCOT to UEs. Each UE can determine all UL channel access parameters according to its own traffic, the received information and predefined LBT priority.

3. If information on expected transmission duration can be acquired, the UE could determine the UL channel access parameters by itself without determining the UL channel access parameters and the LBT priorities by the eNB.

Herein, the eNB indicates the transmission duration to the UE explicitly or implicitly. By acquiring the transmission duration, the UE can select the UL channel access parameters according to the pre-defined rule described above. For example, UE2 could use LBT priority 1 for channel access according to the transmission duration although it has only Best Effort traffic.

CWS Maintenance

Solution 1: A common CWS maintenance is configured for all UEs served by the eNB.

Figure 3:
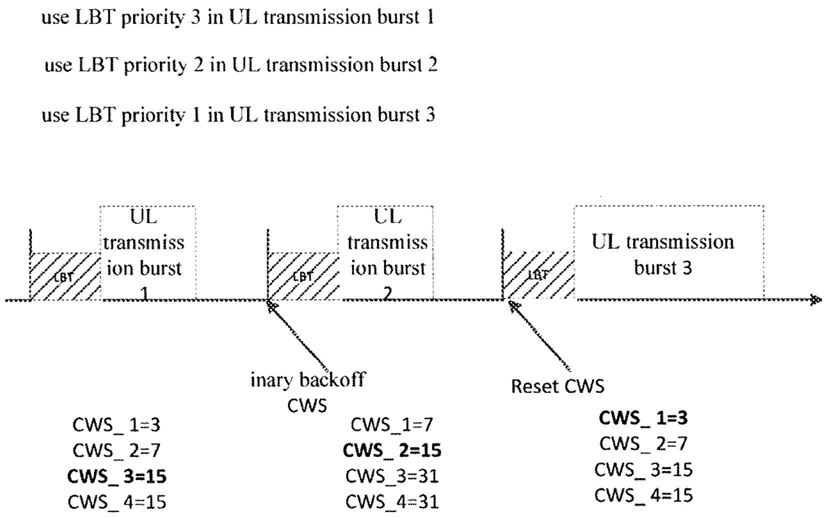
FIG. 3 illustrates a schematic view of CWS maintenance in an eNB according to another embodiment of this disclosure.

In this solution, the eNB may maintain only one set of CWSs with respect to different priorities for all UEs. Also assuming the scenario in FIG. 2, UE1 and UE2 perform LBT Category 4 procedures for UL transmission bursts. If the eNB can decode the PUSCHs for the UE1 and UE2 in the first subframe of the UL transmission burst successfully, all the CWSs can be reset to minimum values corresponding to different priorities. If one of the PUSCHs cannot be decoded, all CWSs should be increased. In a word, CWSs in different priorities should be updated simultaneously as an example shown in FIG. 3.

Solution 2: Individual CWS maintenances are configured for different UEs.

For each UE, the eNB maintains a set of CWSs with respect to different priorities. Also assuming the scenario in FIG. 2, the eNB will update the CWSs of UEL and the CWSs of UE2 after it decodes the first PUSCH of the UL transmission burst.

For all LBT priorities, CWSs are updated.

If the eNB can decode the PUSCH correctly, all LBT priorities reset their CWSs. Otherwise, all LBT priorities increase the CWS values exponentially or linearly.

For conditional LBT priorities, CWSs will be updated.

In an embodiment, only the LBT priority used in the PUSCH will update its CWS.

It should be understood that the above embodiments which constitute a part of the principle of the disclosure are intended to describe but not to limit this disclosure.

It should be noted that the above embodiments are illustrative but not to limit this disclosure thereto. All technical solutions that are not apart from the spirit of the disclosure should fall into the protecting scope of the disclosure. Different technical features, apparatuses and methods presented in different embodiments can be combined to achieve beneficial effects. Furthermore, any reference number in claims should not be construed to limit the related claims. The word "comprise" or "include" does not exclude the presence of apparatuses or steps that are not listed in the claims and description.

The invention claimed is:

1. A method for implementing an Uplink (UL) channel access in a User Equipment (UE) of an Enhanced Licensed Assisted Access (eLAA)-based communication system, comprising:

receiving from a base station a first signaling, which indicates a listen-before-talk (LBT) priority determined by the base station for the UE, wherein relations between LBT priorities and corresponding sets of UL channel access parameters are pre-stored at the UE in a table;

adjusting, by the UE, the LBT priority based on a traffic type;

determining, by the UE, based on the table, a set of UL channel access parameters corresponding to the adjusted LBT priority;

performing an LBT operation using the determined corresponding set of UL channel access parameters; and receiving from the base station updated contention window sizes (CWSs) or a backoff counter generated therefrom via Layer 1 signaling, wherein the base station maintains a set of CWSs, wherein respective CWSs in the set of CWSs are corresponding to different LBT priorities and the set of CWSs is applicable to all UEs, and the base station simultaneously updates the CWSs of all LBT priorities based on a Physical Uplink Shared Channel (PUSCH) decoding result of a last UL transmission burst, wherein the PUSCH decoding result is defined as the ratio of the number of incorrectly decoded PUSCHs to the number of correctly decoded PUSCHs, and the CWSs are exponentially or linearly increased when the ratio is larger than a pre-defined value, and are reset to the minimum CWSs corresponding to respective priorities otherwise.

2. The method of claim 1, wherein the method further comprises:

transmitting a second type of traffics only after all of a first type of traffics have been transmitted, wherein a LBT priority of the first type of traffics is not less than the LBT priority, and a LBT priority of the second type of traffics is lower than the LBT priority.

3. An apparatus to implement an Uplink (UL) channel access in a User Equipment (UE) of an Enhanced Licensed Assisted Access (eLAA)-based communication system comprising:

at least one processor; and at least one memory including computer program code;

the at least one memory and the computer program code configured to, with the at least one processor, cause the apparatus at least to perform:

receiving from a base station a first signaling, which indicates a listen-before-talk (LBT) priority determined by the base station for the UE, wherein relations between LBT priorities and corresponding sets of UL channel access parameters are pre-stored at the UE in a table;

adjusting, by the UE, the LBT priority based on a traffic type;

determining, by the UE, based on the table, a set of UL channel access parameters corresponding to the adjusted LBT priority;

performing a LBT operation using the determined corresponding set of UL channel access parameters; and receiving from the base station updated contention window sizes (CWSs) or a backoff counter generated therefrom via Layer 1 signaling, wherein the base station maintains a set of CWSs, wherein respective CWSs in the set of CWSs are corresponding to different LBT priorities and the set of CWSs is applicable to all UEs, and the base station simultaneously updates the CWSs of all LBT priorities based on a Physical Uplink Shared Channel (PUSCH) decoding result of a last UL transmission burst, wherein the PUSCH decoding result is defined as the ratio of the number of incorrectly decoded PUSCHs to the number of correctly decoded PUSCHs, and the CWSs are exponentially or linearly increased when the ratio is larger than a pre-defined value, and are reset to the minimum CWSs corresponding to respective priorities otherwise.

4. The apparatus of claim 3, wherein the at least one memory and the computer program code are further configured to, with the at least one processor, cause the apparatus at least to perform:

transmitting a second type of traffics only after all of a first type of traffics have been transmitted, wherein a LBT priority of the first type of traffics is not less than the LBT priority, and a LBT priority of the second type of traffics is lower than the LBT priority.

5. The apparatus of claim 3, wherein the PUSCH decoding result is based on PUSCH decoding in the first subframe of the last UL transmission burst, only the PUSCH decoding result of UEs that perform LBT Category 4 operations are considered, when multiple UEs perform LBT operations in a transmission burst, the base station configures the same set of access parameters to all UEs performing LBT in the transmission burst, and the base station indicates the same LBT priority to the multiple UEs.

6. The apparatus of claim 3, wherein the PUSCH decoding result is based on PUSCH decoding in all subframes of the last UL transmission burst, and all UEs that perform UL transmissions in the last UL transmission burst are considered.

7. The apparatus of claim 3, wherein the PUSCH decoding result is based on PUSCH decoding in the last valid subframe of the last UL transmission burst, and only the PUSCH decoding result of UEs that perform LBT Category 4 operations are considered.

8. The apparatus of claim 3, wherein the base station maintains individual sets of CWSs with respect to different priorities for respective UEs, only the LBT priority utilized in the last UL transmission burst updates its CWS, and other LBT priorities maintain their CWS values.

9. The apparatus of claim 8, wherein a CWS is reset if the number of times for using its maximal value reaches a predetermined number of times.

10. The apparatus of claim 8, wherein the CWS is reset if the UE is not scheduled for a predetermined period of time.

11. The apparatus of claim 3, wherein after performing the LBT operation, the UE maximizes channel occupancy by transmitting additional traffics corresponding to LBT priorities larger than the adjusted LBT priority only if the traffics corresponding to LBT priorities smaller than or equal to the adjusted LBT priority have been exhausted.

12. The apparatus of claim 3, wherein the at least one memory and the computer program code are further configured to, with the at least one processor, cause the apparatus at least to perform:

acquiring an expected transmission duration; and selecting an LBT priority and a set of corresponding UL channel access parameters, wherein a maximum channel occupancy time (MCOT) of the selected LBT priority is not shorter than the expected transmission duration, and wherein the expected transmission duration indicates the subframes or time scheduled for transmission by the UE in a UL transmission burst.

13. The apparatus of claim 12, wherein in case that the expected transmission duration is not acquired from the base station, the UE sets the expected transmission duration to be not more than one subframe.

14. The apparatus of claim 12, wherein the expected transmission duration is acquired according to a UL grant in case of multi-subframe scheduling.

15. The apparatus of claim 3, wherein the base station indicates at least one of a CWS value, a maximum channel occupancy time, or an LBT gap configuration directly to the UE via Layer 1 signaling, and the UE determines remaining UL channel access parameters based on the table and the traffic type.

16. A non-transitory computer readable medium comprising computer program instructions for causing an apparatus to implement an Uplink (UL) channel access in a User Equipment (UE) of an eLAA-based communication system by performing at least the following:

receiving from a base station a first signaling, which indicates a listen-before-talk (LBT) priority determined by the base station for the UE, wherein relations between LBT priorities and corresponding sets of UL channel access parameters are pre-stored at the UE in a table;

adjusting, by the UE, the LBT priority based on a traffic type;

determining, by the UE, based on the table, a set of UL channel access parameters corresponding to the adjusted LBT priority; and performing a LBT operation using the determined set of UL channel access parameters; and receiving from the base station updated contention window sizes (CWSs) or a backoff counter generated therefrom via Layer 1 signaling, wherein the base station maintains a set of CWSs, wherein respective CWSs in the set of CWSs are corresponding to different LBT priorities and the set of CWSs is applicable to all UEs, and the base station simultaneously updates the CWSs of all LBT priorities based on a Physical Uplink Shared Channel (PUSCH) decoding result of a last UL transmission burst, wherein the PUSCH decoding result is defined as the ratio of the number of incorrectly decoded PUSCHs to the number of correctly decoded PUSCHs, and the CWSs are exponentially or linearly increased when the ratio is larger than a pre-defined value, and are reset to the minimum CWSs corresponding to respective priorities otherwise.

17. The non-transitory computer readable medium of claim 16, wherein the computer program instructions cause the apparatus to perform at least the following:

transmitting a second type of traffics only after all of a first type of traffics have been transmitted, wherein a LBT priority of the first type of traffics is not less than the LBT priority, and a LBT priority of the second type of traffics is lower than the LBT priority.

18. The non-transitory computer readable medium of claim 16, wherein the computer program instructions cause the apparatus to perform at least the following:

acquiring an expected transmission duration; and selecting an LBT priority and a set of corresponding UL channel access parameters with one or more of the following:

a maximum channel occupancy time (MCOT) of the selected LBT priority is not shorter than the expected transmission duration; and traffic corresponding to LBT priorities smaller than or equal to the selected LBT priority can be transmitted in the expected transmission duration, wherein the expected transmission duration indicates the subframes or time scheduled for transmission by the UE in a UL transmission burst.

19. The non-transitory computer readable medium of claim 18, wherein the computer program instructions cause the apparatus to perform at least the following:

acquiring the expected transmission duration according to a UL grant in case of multi-subframe scheduling.

20. The non-transitory computer readable medium of claim 16, wherein the first signaling is received from the base station via Layer 1 signaling.

* * * * *